United States Patent [19]

Bigalk et al.

[11] Patent Number: 5,045,114

[45] Date of Patent: Sep. 3, 1991

[54] REFLECTIVE COMPOSITION ALUMINUM PARTICLES MILLED TOGETHER WITH RESINOUS BINDER AND PROCESS FOR PREPARING SAME

[75] Inventors: Stephen V. Bigalk, White Bear Lake, Minn.; Stephen C. Hart, Hudson, Wis.

[73] Assignee: H. B. Fuller Licensing & Financing Inc., Wilmington, Del.

[21] Appl. No.: 516,350

[22] Filed: May 1, 1990

[51] Int. Cl.$^5$ .............................................. C09C 1/64
[52] U.S. Cl. ................... 106/404; 106/400; 106/499; 524/441; 524/904
[58] Field of Search ................ 524/441, 904; 106/404

[56] References Cited

U.S. PATENT DOCUMENTS

| | | | |
|---|---|---|---|
| 2,941,894 | 6/1960 | McAdow | 106/404 |
| 3,252,376 | 5/1966 | DeVries | 350/105 |
| 3,632,395 | 1/1972 | Dyson | 117/72 |
| 3,692,731 | 9/1972 | McAdow | 260/32.8 R |
| 3,697,070 | 10/1972 | McAdow | 106/291 |
| 3,708,321 | 1/1973 | Spieles | 117/17 |
| 3,879,625 | 4/1975 | McVey et al. | 313/27 |
| 3,928,668 | 12/1975 | Snow | 427/14 |
| 3,932,347 | 1/1976 | Camelon et al. | 524/441 |
| 3,932,348 | 1/1976 | Camelon et al. | 524/441 |
| 3,988,494 | 10/1976 | McAdow | 428/328 |
| 3,998,768 | 12/1976 | Pettit, Jr. | 525/186 |
| 4,003,872 | 1/1977 | Rolles et al. | 260/37 |
| 4,012,655 | 3/1977 | McVey et al. | 313/27 |
| 4,025,665 | 5/1977 | Hannon | 427/192 |
| 4,027,066 | 5/1977 | Victorious | 525/161 |
| 4,028,326 | 6/1977 | Golovoy | 260/42.22 |
| 4,028,327 | 6/1977 | Golovoy | 260/42.22 |
| 4,048,136 | 9/1977 | Kobayashi et al. | 524/441 |
| 4,057,607 | 11/1977 | Soehngen et al. | 427/195 |
| 4,072,795 | 2/1978 | Noonan | 427/195 |
| 4,138,511 | 2/1979 | Rolles et al. | 427/201 |
| 4,197,351 | 4/1980 | Rolles et al. | 428/402 |
| 4,286,021 | 8/1981 | Brandley, Jr. | 428/413 |
| 4,287,231 | 9/1981 | DeCaro et al. | 427/106 |
| 4,292,087 | 9/1981 | Bell | 106/193 M |
| 4,629,756 | 12/1986 | Kerbow | 524/440 |

FOREIGN PATENT DOCUMENTS

| | | |
|---|---|---|
| 320375 | 8/1987 | European Pat. Off. . |
| 1215847 | 5/1966 | Fed. Rep. of Germany . |
| 2109968 | 2/1972 | France . |
| 54-106541 | 8/1979 | Japan . |
| 58-008193 | 1/1983 | Japan . |
| 59-002471 | 1/1984 | Japan . |
| 62-181721 | 8/1987 | Japan . |
| 8601656 | 10/1986 | Rep. of Korea . |

OTHER PUBLICATIONS

"Eternabrite 301-1", Jan. 1987, and Eternabrite 651-1, Sep. 1980, Product Information Disclosures and Leafing Aluminum Pigments Booklet, all by Silberline Mfg. Co., Inc.

Kern, "Use of Aluminum Pigments in Plastics", Silberline Manufacturing Co.

Richart, "Powder Coatings", Kirk-Othner Encyclopedia of Chemical Technology, 2nd Ed., vol. 16, pp. 944-945.

*Primary Examiner*—William R. Dixon, Jr.
*Assistant Examiner*—Scott L. Hertzog
*Attorney, Agent, or Firm*—Merchant, Gould, Smith, Edell, Welter & Schmidt

[57] ABSTRACT

The present invention is a powder coating composition as well as a process for its preparation. The powder coating, having a particle size of about 5 to 250 microns, can form improved, glossy coatings similar to chrome plate. The process comprises milling together a resinous binder and aluminum particles to produce a powder material, adding an effective amount of a fluidizing agent per hundred parts of binder to the powder material having a particle size of 5 to 250 microns.

53 Claims, No Drawings

REFLECTIVE COMPOSITION ALUMINUM PARTICLES MILLED TOGETHER WITH RESINOUS BINDER AND PROCESS FOR PREPARING SAME

FIELD OF THE INVENTION

The invention relates to powder coating technology which can be used to produce hard, uniform coatings through the heat curing of a powder uniformly applied to a surface. In particular, it relates to the production of improved reflective coatings by applying a powder coating to a surface which, after heating, forms a shiny, chrome-like appearance. The preferred powder coating is based on a thermosetting resin.

BACKGROUND OF THE INVENTION

Bright, shiny, metallic finishes are desirable in many commercial applications. The major source of these shiny finishes is chemical or electrical plating of chrome. However, chrome treatments have environmental and economic drawbacks. Chromium is a major source of heavy metal contamination and is expensive to produce. With this in mind, a great deal of attention has been given to producing shiny coatings with powder coating compositions. Powder coatings are generally produced by mixing a binder with other constituents which can be melt mixed, cooled, and pulverized to provide a powder material that is easily applied to a conductive surface. The powder or surface is then heated to cause the powder coating composition to melt and flow to form a continuous coating.

The powder coating compositions are most commonly applied through electrostatic spray coating or fluidized bed coating. In the electrostatic spray process, the coating composition is dispersed in an air stream before being subjected to a high voltage field in which the particles pick up an electrostatic charge. The charged particles are then attracted to a charged substrate resulting in a fine layer of powder on the substrate. The coated substrate is then heated to a temperature sufficient to melt the powder coating and to cause it to flow providing a smooth, even finish.

Fluidized bed coating makes it possible to apply films as thick as about 2.5 mm. In this method, the powder coating composition is fluidized in a fluidized bed by passing a fluidizing gas stream into a vessel containing the powder coating. A substrate is heated in an oven to a temperature above the melting point of the powder coating and is then dipped into the fluidized bed. The powder coating particles contact the hot surface, melt and flow on the substrate surface. See generally, Kirk-Othmer, *Concise Encyclopedia of Chemical Technology*, pp. 944-945 (1985).

One attempt to achieve a chrome-like finish has been through the incorporation of aluminum particles or aluminum flake into powder coating compositions. However, in our research we have found that the incorporation of aluminum flake into conventional powder coating compositions do not have a shiny chrome-like appearance as measured by the high reflectance of conventional chrome electro-plating.

In light of the current state of the art, a powder coating composition and processes for the production of such powder compositions are needed which can form a glossy, highly reflective metallic finish that appears to be as shiny as chrome plate.

BRIEF DESCRIPTION OF THE INVENTION

The invention relates to a powder product that results from a process of preparing a powder coating material which can be applied to a substrate to form a coated article having a glossy, high reflective, metallic finish. The process comprises (a) milling a resinous binder and about 1 to 12 parts of aluminum particles per 100 parts of binder to produce a powder material; (b) adding an effective amount of a fluidizing agent per each 100 parts of binder to the powder material, and (c) removing milling media and particles greater than about 250 microns from the powder material to produce a coating material having a particle size of about 5 to 250 microns. Such powder coating materials, when coated and melt formed on a substrate surface, can exhibit high gloss, high reflectance and a metallic finish.

A powder coating composition of the invention can comprise (a) a resinous binder, (b) about 1 to 12 parts of leafing aluminum particles per 100 parts of binder, and (c) an effective amount of a fluidizing agent per 100 parts of binder which are modified in accordance with the invention. The resinous binder and the aluminum particles are milled and then separated from the milling media and oversized particles to produce a powder coating material having a particle size between about 5 and 250 microns.

Another aspect of our invention comprises a finished article with a coating made from the novel powder coating composition.

DETAILED DESCRIPTION OF THE INVENTION

Composition

One aspect of our invention concerns a powder coating composition which comprises (a) a resinous binder, (b) about 1 to 12 parts of aluminum particles per 100 parts of binder, and (c) an effective amount of a fluidizing agent per 100 parts of binder, whereby the resinous binder and aluminum particles are milled and separated from milling media and oversized particle to produce a powder coating composition having a particle size between about 5 to 250 microns.

The resinous binder used in our invention may be either a thermoplastic resin or a thermosetting resin. Generally, the binder is a material which will flow smoothly at elevated temperatures and which will then cure (thermoset) or solidify (thermoplastic) to a final, smooth, even, solid form.

Representative, non-exclusive, thermoplastic resins include vinyl homo- and copolymers, such as polyethylene, polypropylene, ethylene copolymers, e.g., polyethylene-$C_{3-8}$ olefin copolymers, polyvinyl chloride, polyvinylidene fluoride, ethylene-vinyl acetate, aromatic vinyls, e.g., polystyrene and styreneacrylonitrile resins; polyacrylics, such as polyacrylates and polymethacrylates, e.g., polymethylmethacrylate and polyethylmethacrylate; cellulosics, such as cellulose ethers and cellulose esters; polyesters, such as poly(alkylene terephthalate), e.g., polyethylene terephthalate; and polyamides, such as nylon.

The thermosetting resins used in the present invention may be either addition reaction cure or condensation reaction cure thermosetting resins. Representative, non-exclusive, thermosetting resins include epoxies such as diglycidyl ethers of bisphenol A, and epoxy cresol/novolacs; phenolic resins, such as novolacs;

polyurethanes, such as polyisocyanate/polyether resins and polyisocyanate/polyester resins with blocked isocyanate groups; saturated polyesters such as saturated terephtalic acid based polyesters and carboxylated polyesters; and acrylics based on crosslinkable acrylate resins such as carboxyl terminated resins, selfcrosslinking etherified methoxylated resins based on acrylamides and/or methacrylamides. Most of these thermosetting resins require the use of a curative to achieve a final crosslinked structure, but some of these, e.g., selfcrosslinking etherified methoxylated resins based on acrylamides and/or methacrylamides, will selfcrosslink when subjected to elevated temperatures. The coupling of thermosetting resins and curative agents is well known to those skilled in the coatings art, and any such coupling can be used in the present invention which does not detrimentally affect the metallic finish of the present coating. For purposes of calculating proportions of components in thermosetting systems, curatives are included in the term "binder".

In the final, solid form, the resinous binder has a uniform content of milled aluminum particles which are preferably introduced as leafing aluminum flakes. Leafing aluminum particles or flakes are coated with a material, e.g., stearic acid, and when applied to a surface, the particles can orient in an interleaved structure parallel to the surface of the finished coating. This can result in a highly lustrous and reflective coating. Aluminum flakes are preferably introduced at less than about 50 microns in diameter. More preferably, the aluminum flakes have a particle size of about 1 to about 45 microns. Most preferably, the aluminum flakes are sized such that 99.9% pass through 325 mesh screen, i.e., a diameter of less than about 45 microns.

Preferably, the leafing aluminum flakes are introduced as a paste of aluminum and solvents having at least about 40 wt-% aluminum flake and more preferably about 60 to 70 wt-% aluminum flake. Preferably, the aluminum paste is introduced in a quantity to provide about 1 to 12 parts of aluminum particles per 100 parts of resin, e.g., about 1.5 to 18.5 parts of an aluminum paste containing about 65 wt-% aluminum particles. More preferably about 2 to 6.5 parts of aluminum particles are used, and most preferably about 2.5 to 4.5 parts of aluminum particles are used.

The solvent incorporated in the aluminum paste may be any solvent which does not detrimentally affect the other components of the powder coating composition. Preferably, the solvent is a petroleum based solvent such as mineral spirits, petroleum spirits, petroleum benzin, petroleum ether, ligroin, refined solvent naptha or mixtures thereof. Most preferably, the solvent in the aluminum paste is mineral spirits, i.e., higher boiling petroleum fractions, e.g., a boiling point above about 80° C.

In addition to the above, other constituents may be incorporated into the coating composition. Such constituents include flow control agents, scavengers, UV stabilizers, anti-oxidants and fillers. Flow control agents are generally incorporated into the powdered coating composition to improve the flow of the resin as it is melted to provide a smoother finish of the final solid coating.

Once the powder coating composition has been formed, an effective amount of a fluidizing agent is added to improve the flow characteristics of a fluidized mixture of the powder coating composition and air. Preferably, about 0.1 to 1.0 parts of a fluidizing agent is added per 100 parts of binder. The fluidizing agent is a composition which aids the powder coating composition particles to remain free flowing and lump free. Various fluidizing agents may be used such as fumed silicas and aluminum oxide.

Process

The present invention relates to a process of preparing a powder coating material which can be applied to a substrate to form a coated article having a glossy, highly reflective, metallic finish, the process comprising (a) milling resinous binder with about 1 to 12 parts of leafing aluminum particles per 100 parts of the binder for at least about 18 hours to produce a powder material, (b) adding an effective amount of a fluidizing agent per part of the binder to the powder material, and (c) removing milling media and particles greater than about 250 microns from the powder material to produce a powder coating material having a particle size of about 5 to 250 microns, whereby a coated article, prepared from a substrate which is coated with the powder coating material, exhibits high gloss, high reflectance and a metallic finish.

Preferably, a ball mill can be charged with milling media, resin, about 1 to 12 parts of aluminum particles per 100 parts of resin, and about 0 to 2 parts of other optional components per 100 parts of resin. The components are then milled for at least about 18 hours to produce a powder coating composition having a particle size of about 5 to 250 microns. If the powder is milled for too short a time, the resulting coating is of lower gloss and whiter in color than that resulting from the powdered coating composition of the present invention. On the other hand, longer milling times require more energy and are less economical.

The time of milling is generally greater than about 18 hours. Preferably, the milling time is from about 22 to 28 hours, and most preferably it is from about 24 to 25 hours.

The type of milling media used in the process of this invention may generally be any medium which is capable of reducing the powders to the desired size without any undue contamination of the powder coating composition. In one embodiment of our process, ceramic ball media are used.

After removing the powder coating material from the mill, an effective amount of a fluidizing agent, more preferably, about 0.2 to 0.4 parts per 100 parts of binder can be added to the powder material.

Next, the oversized particles and milling media are removed from the powder material. This may be done by any method known to those skilled in the art, and preferably, it is accomplished through screening. Preferably, the powder material is passed through a screen of 60 mesh (U.S.A. Standard) to result in the powder coating material of our invention. More preferably, the powder material is screen through a 140 U.S.A. Standard mesh to produce a powder coating material, and at least about 80% of the powder coating material passes through a 400 mesh U.S.A. Standard screen, and most preferably, at least about 85% passes through a 400 mesh U.S.A. Standard screen.

In other words, in a most preferred embodiment, the milled powder coating material containing milling media is screened through a 140 mesh U.S.A. Standard screen, and therefore, has a particle size range of about 5 to 100 microns. Preferably, about 80% of the powder has a particle size of about 10 to 40 microns, and most preferably, about 85% of the screened powder coating composition has a particle size of about 10 to 40 microns.

While we do not wish to be held to this theory, we believe that the glossy appearance is a result of the relative particle size of the binder and the aluminum. We believe that the particle size range of the binder and the aluminum overlap, and that this overlap allows for the more intimate association of the particles along with a more even, final, solid coating. We also believe that the aluminum particle size is not greatly affected by the milling process. While some size reduction undoubtedly occurs among the aluminum particles, the milling appears to predominately affect the binder particle size.

The powder coating material obtained by our process may then be either stored for later use or coated onto a substrate. The powder coating material or composition may be stored for any reasonable length of time prior to use. Preferably, the material is stored for less than about one year, and most preferably, it is stored for less than about six months. The powder composition may be stored at temperatures significantly less than the cure or melt temperature of the binder or any other component. Preferably, the material is stored at less than about 100° F., and most preferably at less than about 80° F.

The coating process may be any powder coating process known to those skilled in the art, e.g., electrostatic spray coating or fluidized bed coating. In the electrostatic spray coating process, the powder coating composition is applied to the substrate at about room temperature. The substrate and coating composition are then heated at elevated temperatures to cause the coating material to melt and flow thereby producing a final solid coating. The conditions of this process depend especially on the resin and curative (if thermosetting) chosen as binder. In thermosetting systems, this step is also known as a cure. This is the temperature and time required for the curative to crosslink the thermosetting resin. This may be measured by the metal temperature cure, i.e., the time it takes the coating composition to cure once the substrate metal has attained a certain temperature. If the coating receives a less than optimal cure, its adhesion properties diminish.

In one embodiment of the present invention, employing a polyester resin and a blocked isocyanate curative, the powder coating composition is cured at about 400° F. metal temperature cure for about 12 to 15 minutes.

Article of Manufacture

Yet another embodiment of our invention concerns articles which are coated with the powder coating composition of the present invention. These display excellent gloss, reflectance, and color properties. Additional coating properties such as impact, hardness, adhesion, etc. are controlled by the resin binder system chosen. Such articles include, e.g., auto components and equipment, furniture, industrial and domestic equipment, safety and recreational equipment, and lighting fixtures.

EXAMPLES

The following specific examples, which contain the best mode, can be used to further illustrate the invention.

Example I

About 100 g of a solid, hydroxyl functional saturated polyester resin with an acid number from 5 to 60 (RUCOTE HBF, polyester resin, available from Ruco Polymer Corp.), about 22 g of an isophorone diisocyante curative (RUCOTE NI-2, available from Ruco Polymer Corp.), about 1.5 g of an acrylic polymer/silica mix containing about 67 wt-% acrylic polymer and about 33 wt-% silicone dioxide (RESIFLOW P-67, available from Estron Chemical, Inc.), about 1 g of a benzoin water scavenger (available from Mitsubishi Chemical Co., LTD), and about 6 g leafing grade aluminum paste having at least 72 wt-% solids in mineral spirits (ETERNABRITE ® 651-1 available from Silberline Manufacturing Co., Inc.) are placed in a ball mill which is charged with ceramic ball media and milled for about 28 hours. About 0.4 g of an aluminum oxide powder is added to the composition as a fluidizing agent. The composition is discharged and screened through 140 mesh (U.S.A. Standard, ASTM E-11).

The powder coating composition is then electrostatically sprayed onto 24 gauge sheet steel. The coated sheet steel is then cured at about 400° for about 15 minutes. The resulting coating showed excellent reflectance, gloss and color.

Comparative Example A

The components of Example I excluding the fluidizing agent are melt mixed and extruded into a sheet. The resulting composition is broken and ground such that over 50% of the pulverized material passed through a 325 mesh screen (U.S.A. Standard, ASTM E-11). About 0.4 g aluminum oxide powder is added to the composition as a fluidizing agent.

The resulting powder coating composition (representative of the state of the art) is electrostatically applied to a 24 gauge sheet steel panel and cured for 15 minutes at 400° F. A comparison between the finished coatings of Examples I and II are indicated below in Tables I and II. These coated sheets were compared to a standard of chrome plating.

TABLE I

| | Reflectance* | | | |
|---|---|---|---|---|
| Chromeplate Standard | 59.71 | 61.57 | 62.68 | 63.90 |
| | 64.04 | 64.07 | 63.74 | 63.33 |
| | 62.70 | 62.13 | 61.82 | 61.51 |
| | 61.31 | 61.34 | 61.18 | 60.91 |
| Example I | 57.12 | 57.43 | 57.71 | 58.61 |
| | 59.00 | 59.42 | 59.86 | 60.15 |
| | 60.31 | 60.31 | 60.42 | 60.36 |
| | 60.30 | 60.40 | 60.06 | 59.57 |
| Comparative Example A | 19.06 | 18.87 | 18.65 | 18.64 |
| | 18.46 | 18.36 | 18.29 | 18.18 |
| | 18.03 | 17.87 | 17.73 | 17.54 |
| | 17.34 | 17.21 | 16.97 | 16.55 |

*Reflectance values are measured in a spectrophotometer (model M2020PL, manufactured by MacBeth) and the values are a measure of the % of incident light energy which is reflected at increasing wavelengths across the visible spectrum. The first value represents % reflectance at 400 nm and each successive value represents % reflectance at wavelengths increasing in 20 nm increments.

TABLE II

| Gloss (60 degree) | |
|---|---|
| Example I | 438 |
| Comparative Example A | 88 |

Examples II–IV

Example I was repeated while varying the milling times. The milling time for each example is shown in Table III below.

TABLE III

| | Milling Time (hrs.) |
|---|---|
| Example II | 6 |
| Example III | 15 |
| Example IV | 24 |

Examples V-VII

Examples II-IV were repeated using 3 g of a leafing grade aluminum paste (ETERNABRITE® 651-1).

Examples VII-X

Examples II-IV were repeated using 12 g of a leafing grade aluminum paste (ETERNABRITE® 651-1).

Comparisons of Examples II-X are shown below in Table IV.

TABLE IV

| Powder Coating | 20° Gloss | 60° Gloss | Visual Appearance |
|---|---|---|---|
| Example II | 39 | 170 | Low gloss, "whiter" silver color |
| Example III | 137 | 331 | Medium gloss, silver color |
| Example IV | 357 | 469 | High gloss, silver color |
| Example V | 66 | 170 | Medium gloss, light gray color |
| Example VI | 212 | 282 | High gloss, gray color |
| Example VII | 263 | 267* | High gloss, gray color |
| Example VIII | 10 | 62 | Matte finish, silver color |
| Example IX | 25 | 137 | Low gloss, silver color |
| Example X | 45 | 202 | Medium gloss, silver color |

*Lower gloss value due to greater absorbance of incidental light due to darker surface color.

The above examples and data demonstrate that the powder coating composition of our invention exhibits superior reflectance in comparison with other coating compositions of the prior art, especially those prepared through melt mixing and subsequent size reduction of aluminum powder coatings. Additionally, these data show that insufficient ball mill time results in less than ideal powder coating compositions.

The discussion, examples, and data found above provide a thorough understanding of the invention. However, since many embodiments of the invention can be made without departing from the spirit and scope of the invention, the invention resides in the claims hereinafter appended.

What is claimed is:

1. A process of preparing a powder coating material which can be applied to a substrate to form a glossy, highly reflective, finish, which process comprises:
   (a) milling together a resinous binder and about 1 to 12 parts of aluminum particles per 100 parts of binder to produce a powder coating material;
   (b) adding an effective amount of a fluidizing agent per 100 parts of binder to the powder coating material; and
   (c) removing milling media and particles of powder material greater than about 250 microns from the powder material, wherein a powder coating material having a particle size of about 5 to 250 microns is obtained.

2. The process of claim 1 wherein the aluminum particles are introduced as a leafing aluminum paste.

3. The process of claim 2 wherein the leafing aluminum paste comprises about 40 to about 90 wt-% leafing aluminum particles and about 10 to 60 wt-% of a solvent.

4. The process of claim 1 wherein the aluminum particles comprise leafing aluminum particles.

5. The process of claim 4 wherein the leafing aluminum particles are present at about 2 to 6.5 parts per 100 parts of binder.

6. The process of claim 3 wherein the leafing aluminum particles are present at about 2.5 to 4.5 parts per 100 parts of binder.

7. The process of claim 1 comprising removing particles of coating material greater than about 100 microns.

8. The process of claim 7 wherein at least 80% of the powdered coating material produced has a particle size of about 10 to 40 microns.

9. The process of claim 1 wherein the resin binder comprises a thermoplastic resin, a thermosetting resin or mixtures thereof.

10. The process of claim 9 wherein the thermoplastic resin comprises a vinyl homo- or copolymer, a polyacrylic, a cellulosic, a polyester, a polyamide, or mixtures thereof.

11. The process of claim 10 which further comprises a plasticizer.

12. The process of claim 7 in which the thermosetting resin comprises an epoxy, a phenolic resin, a saturated polyester having functional groups, a polyurethane, an unsaturated polyester, an acrylic based on crosslinkable acrylate resins, or mixtures thereof.

13. The process of claim 12 which further comprises about 1 to about 2 parts of a flow control agent per hundred parts of binder.

14. The process of claim 1 in which the fluidizing agent comprises fumed silica, aluminum oxide, or mixtures thereof.

15. The process of claim 1 wherein the milling comprises ball milling.

16. A process of preparing a powder coating material which can be applied to a substrate to form a glossy, highly reflective, finish, which process comprises:
   (a) ball milling together a resinous binder and about 2.5 to 4.5 parts of leafing aluminum particles per 100 parts of binder for about 22 to 28 hours to produce a powder coating material;
   (b) adding an effective amount of a fluidizing agent per 100 parts of binder to the powder coating material; and
   (c) removing milling media and particles of powder coating material greater than about 100 microns from the powder coating material;
wherein the leafing aluminum particles are introduced as a paste and a powder coating material having a particle size of about 10 to 100 microns is obtained.

17. A powder coating composition which comprises:
   (a) a resinous binder;
   (b) about 1 to 12 parts of aluminum particles per 100 parts of binder; and
   (c) an effective amount of a fluidizing agent per 100 parts of binder;
wherein the powder composition has a particle size of about 5 to 250 microns and the binder and aluminum particles are milled together producing a powder coating material.

18. The composition of claim 17 in which the leafing aluminum particles are introduced as a leafing aluminum paste having an initial aluminum particle size of less than about 45 microns.

19. The composition of claim 18 in which the leafing aluminum paste comprises about 40 to 90 wt-% leafing aluminum and about 10 to 60 wt-% of a solvent.

20. The composition of claim 17 wherein the leafing aluminum particles are present at about 2 to 6.5 parts per 100 parts of binder.

21. The composition of claim 20 wherein the leafing aluminum particles are present at about 2.5 to 4.5 parts per 100 parts of binder.

22. The composition of claim 17 wherein the powder composition has a particle size of 5 to 100 microns.

23. The composition of claim 22 wherein at least 80% of the powdered coating material produced has a particle size of about 10 to 40 microns.

24. The composition of claim 17 wherein the resin binder comprises a thermoplastic resin, a thermosetting resin or mixtures thereof.

25. The composition of claim 24 wherein the thermoplastic resin comprises a vinyl homo- or copolymer, a polyacrylic, a cellulosic, a polyester, a polyamide, or mixtures thereof.

26. The composition of claim 25 which further comprises a plasticizer.

27. The composition of claim 24 wherein the thermosetting resin comprises an epoxy, a phenolic resin, a saturated polyester having functional groups, a polyurethane, an unsaturated polyester, an acrylic based on crosslinkable acrylate resins, or mixtures thereof.

28. The composition of claim 27 which further comprises about 1 to 2 parts of a flow control agent per hundred parts of binder.

29. The composition of claim 17 wherein the fluidizing agent comprises fumed silica, aluminum oxide, or mixtures thereof.

30. A process of preparing coated articles having a glossy, highly reflective metallic finish, the process comprising:
    (a) milling together a resinous binder and about 1 to 12 parts of leafing aluminum particles per 100 parts of binder to produce a powder coating material;
    (b) adding an effective amount of a fluidizing agent per 100 parts of binder to the powder coating material;
    (c) removing milling media and particles greater than about 250 microns from the powder material, wherein a powder coating material having a particle size of about 5 to 250 microns is obtained;
    (d) applying the powder coating material onto a substrate to be coated to form a coated substrate; and
    (e) heating the coated substrate to form a coated article having a glossy, highly reflective metallic finish.

31. The process of claim 30 wherein the leafing aluminum particles are introduced as a paste.

32. The process of claim 31 wherein the leafing aluminum paste comprises about 40 to 90 wt-% leafing aluminum and about 10 to 60 wt-% of a solvent.

33. The process of claim 32 wherein the leafing aluminum paste comprises aluminum particles having initial particle size of less than about 45 microns.

34. The process of claim 30 wherein the leafing aluminum particles are present at about 2 to 6.5 parts per 100 parts of binder.

35. The process of claim 30 wherein the leafing aluminum particles are present at about 2.5 to 4.5 parts per 100 parts of binder.

36. The process of claim 30 comprising removing particles of coating material greater than about 100 microns.

37. The process of claim 33 wherein at least 80% of the powdered coating material produced has a particle size of about 10 to 40 microns.

38. The process of claim 30 wherein the resinous binder comprises a thermoplastic resin, a thermosetting resin or mixtures thereof.

39. The process of claim 38 wherein the thermoplastic resin comprises a vinyl homo- or copolymer, a polyacrylic, a cellulosic, a polyester, a polyamide, or mixtures thereof.

40. The process of claim 39 which further comprises a plasticizer.

41. The process of claim 38 wherein the thermosetting resin comprises an epoxy, a phenolic resin, a polyurethane, a saturated polyester having functional groups, an unsaturated polyester, an acrylic based on crosslinkable acrylate resins, or mixtures thereof.

42. The process of claim 41 which further comprises about 1 to about 2 parts of a flow control agent per hundred parts of binder.

43. The process of claim 30 wherein the milling comprises ball milling.

44. A coated article comprising:
    (a) a substrate;
    (b) a coating comprising:
        (i) a resinous binder,
        (ii) about 1 to 12 parts of leafing aluminum particles, having a size of less than about 45 microns, per 100 parts of binder, and
        (iii) an effective amount of a fluidizing agent per 100 parts of binder wherein the coating has a reflectance of greater than about 50% of incident light energy and the binder and aluminum particles are milled together producing a powder coating material.

45. The coated article of claim 44 wherein the aluminum particles comprise a leafing aluminum paste.

46. The coated article of claim 45 wherein the leafing aluminum paste comprises about 40 to 90 wt-% leafing aluminum particles and about 10 to 60 wt-% of a solvent.

47. The coated article of claim 44 wherein the coating is formed from a powder coating material having a particle size of about 5 to 250 microns.

48. The coated article of claim 44 wherein the resin binder comprises a thermoplastic resin, a thermosetting resin or mixtures thereof.

49. The coated article of claim 48 wherein the thermoplastic resin comprises a vinyl homo- or copolymer, a polyacrylic, a cellulosic, a polyester, a polyamide, or mixtures thereof.

50. The coated article of claim 49 which further comprises a plasticizer.

51. The coated article of claim 48 wherein the thermosetting resin comprises an epoxy, a phenolic resin, a saturated polyester having functional groups, a polyurethane, an unsaturated polyester, an acrylic based on crosslinkable acrylate resins, or mixtures thereof.

52. The coated article of claim 44 which further comprises about 1 to 2 parts of a flow control agent per hundred parts of binder.

53. The coated article of claim 44 which exhibits a reflectance of about 55 to 60% incident light energy.

* * * * *